(12) United States Patent
Pai et al.

(10) Patent No.: US 12,261,685 B2
(45) Date of Patent: Mar. 25, 2025

(54) METASTRUCTURED PHOTONIC DEVICES FOR MULTIPLEXING OR DEMULTIPLEXING OF OPTICAL SIGNALS

(71) Applicant: X Development LLC, Mountain View, CA (US)

(72) Inventors: Sunil Pai, San Jose, CA (US); Yi-Kuei Ryan Wu, San Jose, CA (US)

(73) Assignee: X Development LLC, Mountain View, CA (US)

( * ) Notice: Subject to any disclaimer, the term of this patent is extended or adjusted under 35 U.S.C. 154(b) by 424 days.

(21) Appl. No.: 17/887,185

(22) Filed: Aug. 12, 2022

(65) Prior Publication Data

US 2024/0056211 A1     Feb. 15, 2024

(51) Int. Cl.
*H04J 14/02*     (2006.01)

(52) U.S. Cl.
CPC ...... *H04J 14/0224* (2013.01); *H04J 14/0307* (2023.08)

(58) Field of Classification Search
CPC .......................... H04J 14/0307; G02B 6/12014
USPC ...................................... 398/43, 79
See application file for complete search history.

(56) References Cited

U.S. PATENT DOCUMENTS

| | | | |
|---|---|---|---|
| 10,862,610 B1 | 12/2020 | Schubert et al. | |
| 2002/0048289 A1* | 4/2002 | Atanackovic | ........... H01L 33/34 372/20 |
| 2006/0126992 A1* | 6/2006 | Hashimoto | ........ G02B 6/12009 385/14 |
| 2020/0073054 A1* | 3/2020 | Yang | .................. H04Q 11/0005 |

(Continued)

FOREIGN PATENT DOCUMENTS

| | | |
|---|---|---|
| KR | 10-2007-0033321 A | 3/2007 |
| WO | 2021-096650 A | 5/2021 |

OTHER PUBLICATIONS

Su et al (Sun et al: "Inverse design and demonstration of a compact on-chip narrowband three-channel wavelength demultiplexer", arXiv:1709.08809v1 [physics.app-ph] Aug. 17, 2017 (Year: 2017).*

(Continued)

*Primary Examiner* — Li Liu
(74) *Attorney, Agent, or Firm* — Christensen O'Connor Johnson Kindness PLLC

(57) ABSTRACT

Photonic devices, photonic integrated circuits, optical elements, and techniques of making and using the same are described. A photonic device includes an input region adapted to receive an optical signal including a multiplexed channel characterized by a distinct wavelength, a dispersive region optically coupled with the input region to receive the optical signal, the dispersive region including a plurality of sub-regions defined by an inhomogeneous arrangement of a first material and a second material, and a plurality of output regions optically coupled with the input region via the dispersive region. The plurality of sub-regions can include an input channel section, an in-coupler section, a parallel channel section, an out-coupler section, and an output channel section. The plurality of sub-regions together can configure the photonic device to demultiplex the optical signal and to isolate the multiplexed channel at a first output region of the plurality of output regions.

20 Claims, 7 Drawing Sheets

(56) References Cited

U.S. PATENT DOCUMENTS

2021/0143930 A1* 5/2021 Schubert .................. G06F 30/23
2021/0149109 A1* 5/2021 Schubert ............ G02B 6/12004

OTHER PUBLICATIONS

Kuang et al: "Ultra-Compact Low Loss Polymer Wavelength (De)Multiplexer With Spot-Size Convertor Using Topology Optimization" IEEE Photonics Journal, vol. 13, No. 3, Jun. 2021 (Year: 2021).*

International Search Report and Written Opinion mailed Nov. 29, 2023, in corresponding International Patent Application No. PCT/US2023/029849, 9 pages.

Cheben, et al., "A high-resolution silicon-on-insulator arrayed waveguide grating microspectrometer with sub-micrometer aperture waveguides", Optics Express, vol. 15, No. 5, Mar. 5, 2007.

Li et al., "Chip-scale demonstration of hybrid III-V/silicon photonic integration for an FBG interrogator", Optica, vol. 4, No. 7, Jul. 2017.

Mansouree et al., "Multifunctional 2.5D metastructures enabled by adjoint optimization", Optica, vol. 7, No. 1, Jan. 2020.

Niemi et al., "Wavelength-Division Demultiplexing Using Photonic Crystal Waveguides", IEEE Photonics Technology Letters, vol. 18, No. 1, Jan. 1, 2006.

Piggott et al., "Inverse design and demonstration of a compact and broadband on-chip wavelength demultiplexer", arXiv:1504.00095v1 [physics.optics] Apr. 1, 2015.

Piggott et al., "Fabrication-constrained nanophotonic inverse design", Scientific Reports, May 11, 2017.

Rank et al., "Toward optical coherence tomography on a chip: in vivo three-dimensional human retinal imaging using photonic integrated circuit-based arrayed waveguide gratings", Light: Science & Applications, 2021.

Shang et al., "Low-Loss Compact Silicon Nitride Arrayed Waveguide Gratings for Photonic Integrated Circuits", IEEE Photonics Journal, vol. 9, No. 5, Oct. 2017.

Shi et al., "Silicon photonic grating-assisted, contra-directional couplers", Optics Express, Feb. 11, 2013, vol. 21, No. 3.

Su et al., "Inverse design and demonstration of a compact on-chip narrowband three-channel wavelength demultiplexer", arXiv:1709.08809v1 [physics.app-ph] Aug. 17, 2017.

Tekeste et al., "High efficiency photonic crystal based wavelength demultiplexer", Optics Express, vol. 14, No. 7, Aug. 21, 2006.

Yao et al., "Intelligent nanophotonics: merging photonics and artificial intelligence at the nanoscale", Nanophotonics, Dec. 19, 2018.

Yuan et al., "An ultra-compact dual-channel multimode wavelength demultiplexer based on inverse design", Elsevier, Jun. 24, 2021.

* cited by examiner

METASTRUCTURED PHOTONIC DEVICES FOR MULTIPLEXING OR DEMULTIPLEXING OF OPTICAL SIGNALS

TECHNICAL FIELD

This disclosure relates generally to photonic devices, and in particular but not exclusively, relates to photonic multiplexers and/or demultiplexers.

BACKGROUND INFORMATION

A photonic multiplexer/demultiplexer is a device that combines multiple distinct optical channels into a multiplexed optical signal or splits the multiplexed optical signal into multiple distinct channels. Multiplexing can include wavelength division multiplexing and time division multiplexing (e.g., for periodic signals). In the context of wavelength-division multiplexing, distinct channels can be distinct wavelength channels characterized by a respective central wavelength. In an illustrative example, fiber optic communications technology can employ multiplexed optical signals in the infrared range that include multiple individual wavelength channels as an approach to increasing the bandwidth of optical signals being sent over an optical fiber. An example of a photonic mux/demux is an arrayed-waveguide grating (AWG). AWGs are capable of multiplexing/demultiplexing multiple distinct wavelength channels into and/or out of an optical fiber.

FIG. 1 illustrates an AWG 100 in line with the current state of the art. AWG 100 includes an input waveguide 105, a first optical element 110, multiple waveguides 115 of different lengths, a second optical element 120, and multiple output waveguides 125. Input waveguide 105 is used to carry a multiplexed optical signal to or from first optical element 110. First optical element 110 is typically a monolithic optical medium formed by depositing silicon materials (e.g., doped silica, undoped silica, or the like) on a silicon substrate. As with first optical element 110, waveguides 115, second optical element 120, and output waveguides 125 are typically also monolithic optical elements formed from homogeneous and high-purity materials. Typically, waveguides 115 are optically isolated from each other by a gap material that induces total internal reflection. The gap material can be or include a dielectric material of relatively lower refractive index or air. Optical isolation is used to control the phase of light entering the second optical elements. To that end, waveguides 115 increase in length by a constant length increment as part of inducing phase-mismatch interference at the inlets of output waveguides 125. The coordinated effect of first optical element 110, waveguides 115, and second optical element 120 is to isolate each distinct wavelength channel of a multiplexed optical signal to a respective output waveguide 125.

Conventional techniques apply classical optical design principles to design the length increments, number of waveguides 115, as well as the size and dimensions of optical elements 110 and 120, to improve multiplexer performance and to reduce losses. However, such techniques typically include lengthening a characteristic length dimension 130 of the AWG to provide adequate path length for the phase-mismatch interference to occur while maintaining an overall shape that is compatible with CMOS systems. This leads to a larger overall device and still may not achieve the desired performance specifications (e.g., channel integrity, power loss) over a desired range of operating wavelengths. For example, silica-based AWGs can have a size of several square centimeters that limits AWG integration density on silicon-based photonic integrated circuit devices. Silicon-on-Insulator (SOI) based waveguide devices can reduce the overall dimensions of the AWG, but with reduced dimensions and the requirement for air-gapped waveguides, fabrication complexity can be prohibitive.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for wavelength-division multiplexer/demultiplexers (mux/demux) having reduced wavelength sensitivities, improved power balance, and reduced power loss are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the photonic device(s) described herein provide improved wavelength sensitives, improved power balance, and/or reduced power loss all within a compact form factor that is orders of magnitude smaller than typical arrayed waveguide grating (AWG) photonic circuits. It is believed these benefits/characteristics are achieved using structural design features that induce optical interference between multiple parallel channels that improve on the design of AWGs in terms of structure and performance.

Figure 2A:
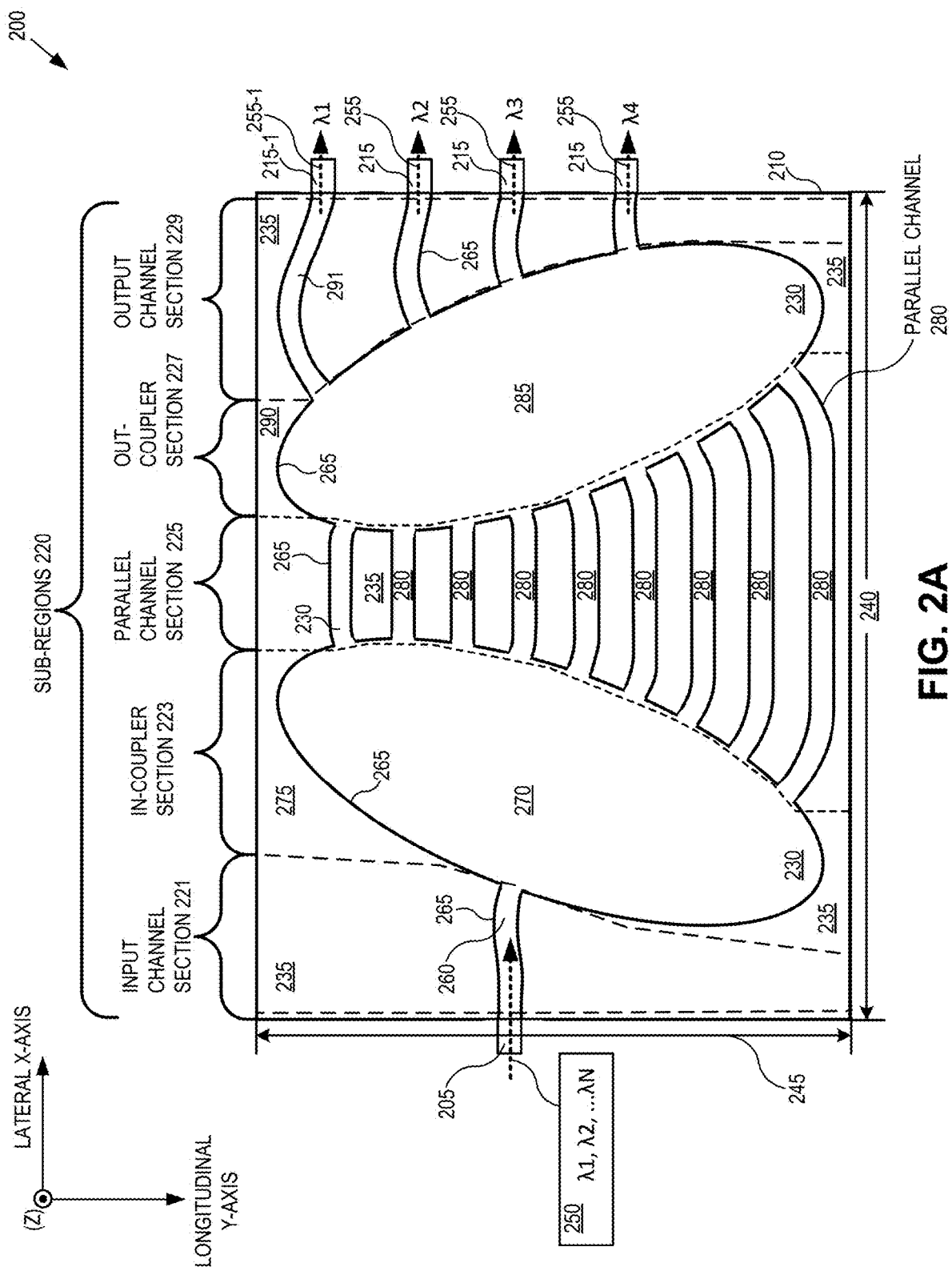
FIG. 2A is a schematic diagram of an example photonic device including a curvilinear wavelength-division multiplexer/demultiplexer divided into multiple functional sub-regions affording improved performance and reduced size, in accordance with an embodiment of the disclosure.

FIG. 2A is a schematic diagram of an example photonic device 200 including a curvilinear wavelength-division multiplexer/demultiplexer (mux/demux) divided into multiple functional sub-regions affording improved performance and reduced size, in accordance with an embodiment of the disclosure. Photonic device 200 is illustrated as a 1×4 wavelength-division demultiplexer, which may be operated as a demux device or a mux device, dependent upon which of its waveguide channels are stimulated with optical power. Photonic device 200 is described in relation to its operation as a demux; however, it should be appreciated that photonic device 200 may be operated in reverse to multiplex multiple distinct wavelength channels into one or more multiplexed optical signals. Similarly, photonic device 200 can be configured for mux/demux of optical signals including more or fewer than four individual channels.

The illustrated embodiment of photonic device 200 includes an input region 205, a dispersive region 210, and multiple output regions 215. The dispersive region includes multiple sub-regions 220, including an input channel section 221, in-coupler section 223, parallel channel section 225, an out-coupler section 227, and an output channel section 229. Each sub-region 220 is defined by a respective inhomogeneous arrangement of a first material 230 and a second material 235. The photonic device 200 can include a surrounding material (not shown in FIG. 2A) in which the input region 205, dispersive region 210, and output regions 215 are formed as part of a CMOS-compatible fabrication process, for example, as a silicon-on-insulator (SOI) photonic integrated circuit.

Photonic device 200 can be fabricated in a variety of materials and form factors. In one embodiment, photonic device 200 is fabricated as a planar waveguide structure disposed within a semiconductor material. First material 230 is characterized by a higher refractive index core material than second material 235. For example, first material 230 can be or include silicon and second material 235 can be silicon dioxide. Other example materials include Silicon Nitride (Si3N4), Gallium Arsenide (GaAs), Indium Gallium Arsenide (InGaAs), other III-V semiconductor materials, or the like. Other non-semiconductor materials can also be used. In some embodiments, first material 230 is characterized by a higher refractive index relative to second material 235. In an embodiment, photonic device 200 is a photonic integrated circuit (PIC) disposed as a planar waveguide in a silicon-on-insulator (SOI) device. Semiconductor manufacturing processes (e.g., CMOS) are well suited for fabricating photonic device 200 due to its compact form factor and small feature sizes (e.g., micron level dimensions). A demonstrative implementation of photonic device 200 may have a first, lateral, dimension 240 of about 2.4 μm (X-axis) by 1.55 to 2.2 μm (Z-axis) and a second, longitudinal, dimension 245 (Y-axis) of about 6 μm. Of course, other dimensions, fabrication techniques, and component materials may be used. In some embodiments, first dimension 240 can be from about 1 μm to about 100 μm, from about 5 μm to about 100 μm, from about 10 μm to about 100 μm, from about 15 μm to about 100 μm, from about 20 μm to about 100 μm, from about 25 μm to about 100 μm, from about 30 μm to about 100 μm, from about 35 μm to about 100 μm, from about 40 μm to about 100 μm, from about 45 μm to about 100 μm, from about 50 μm to about 100 μm, from about 55 μm to about 100 μm, from about 60 μm to about 100 μm, from about 65 μm to about 100 μm, from about 70 μm to about 100 μm, from about 75 μm to about 100 μm, from about 80 μm to about 100 μm, from about 85 μm to about 100 μm, from about 90 μm to about 100 μm, or from about 95 μm to about 100 μm, including fractions and interpolations thereof. Similarly, second dimension 245 can be commensurate with first dimension 240 or can be different from first dimension 240. Advantageously, the footprint of photonic device 200 in the X-Y plane is as much as two orders of magnitude smaller than a typical AWG. This smaller size improves integration of photonic device 200 into photonic integrated circuits and other SOI applications.

The inhomogeneous distribution of first material 230 and second material 235 define multiple refractive and/or reflective interfaces in the dispersive region 210. Through multiple interactions with the interfaces, photonic device 200 can at least partially demultiplex an input optical signal 250 including multiple multiplexed channels ($\lambda 1, \lambda 2, \ldots \lambda N$), where "N" is an integer equal to 2, 3, 4, 5, 6, 7, 8, or more, isolating a first distinct wavelength channel 255-1 at a first output region 215-1 of the output regions 215. In this context, "partial demultiplexing" refers to an inhomogeneous distribution that isolates a multiplexed signal at an output region 215, rather than an individual channel. For example, photonic device 200 can demultiplex a four-channel input optical signal 250 into two output signals 255 that each include two multiplexed channels. In some embodiments, first dimension 240 and/or second dimension 245 is determined based at least in part on the number of multiplexed channels included in optical signal 250. For example, for multiplexing/demultiplexing transformations, the size of photonic device 200 can be positively correlated to the number of input channels in optical signal 250, with a larger device size being implicated by a larger number of input channels. As such, first dimension 240 and/or second dimension 245 can exceed 100 μm based at least in part on the number of input channels. In an illustrative example of a 1×4 demultiplexing device, a size of photonic device 200 can be about 45 μm×16 μm, 30 μm×16 μm, or the like. A demultiplexing photonic device for a 1×8 transformation can be larger in at least one dimension, for example 45 μm by 32 μm, 30 μm by 32 μm, or the like.

Optical signal 250 can include multiple distinct wavelength channels 255, such that sub-regions 220 together configure photonic device 200 to demultiplex the multiplexed optical signal 250 and to isolate distinct wavelength channels 255 at respective output regions 215. For example, distinct wavelength channels 255 can be characterized by respective central wavelengths in the ultraviolet, visible, or infrared ranges. For applications in fiber optic communications, infrared wavelengths can be used in wavelength ranges between 1000 nm and 1500 nm. For example, in a 1×4 wavelength-division demultiplexer, input optical signal 250 can include four distinct wavelength channels 255, including a first distinct wavelength channel characterized by a central wavelength of about 1266 nm, a second distinct wavelength channel characterized by a central wavelength of about 1269 nm, a third distinct wavelength channel characterized by a central wavelength of about 1312 nm, and a fourth distinct wavelength channel characterized by a central wavelength of about 1366 nm. In this context, the term "about" refers to a range of values equal to or within ±10% of the stated value. In line with the principles of inverse design, described below, the identification of a number of distinct wavelength channels 255 and their respective central wavelengths, as well as the composition of first material 230 and second material 235, the size of dispersive region 210, and other parameters, can influence the resulting inhomogeneous distribution of first material 230 and second material 235, and thus the overall structure of photonic device 200.

Figure 1:
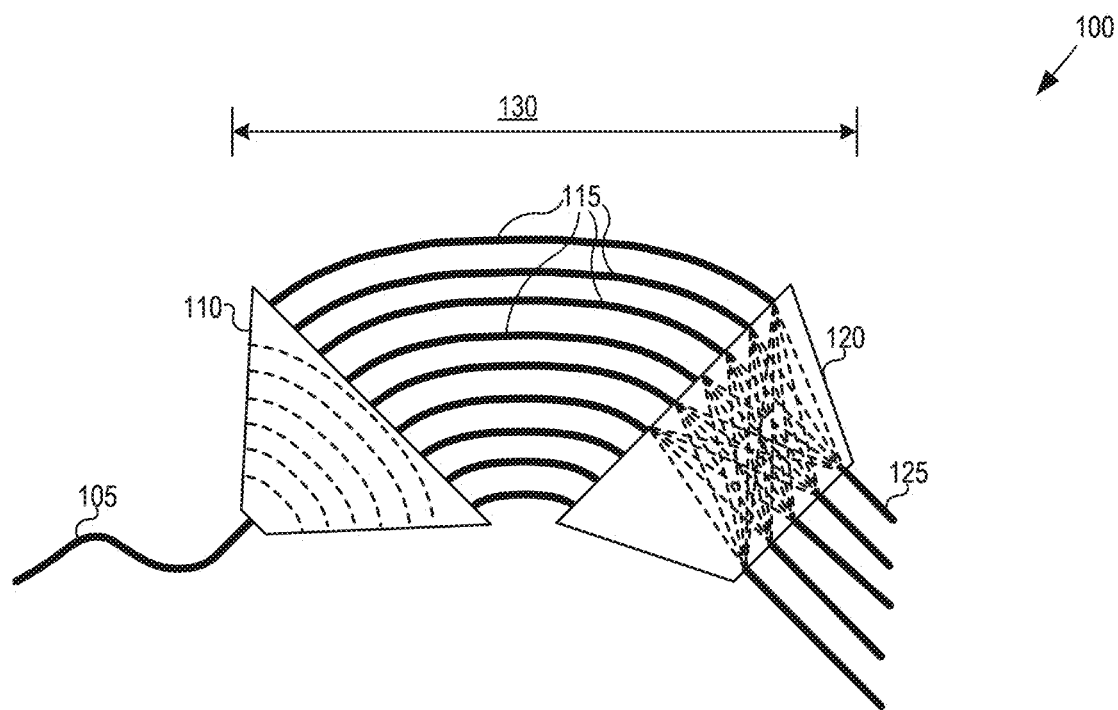
FIG. 1 (PRIOR ART) is a schematic diagram illustrating a conventional arrayed waveguide grating.

The sub-regions 220 apply respective functional transformations to the optical signal 250 resulting from the respective inhomogeneous distributions of each sub-region 220. The dispersive region 210 can be optically continuous across lateral dimension 240 and longitudinal dimension 245 over the dispersive region 210. In this context, "optically continuous" refers to the inhomogeneous arrangement of the first material and the second material being formed from a plurality of islands 295 (in reference to FIG. 2B) of second material 235 disposed in a matrix of first material 230, or vice-versa, where the matrix is coextensive with dispersive region 210. In contrast, the component elements of a typical AWG, as illustrated in FIG. 1, are discrete and optically isolated from each other (e.g., by an air gap or a dielectric gap material).

Figure 2B:
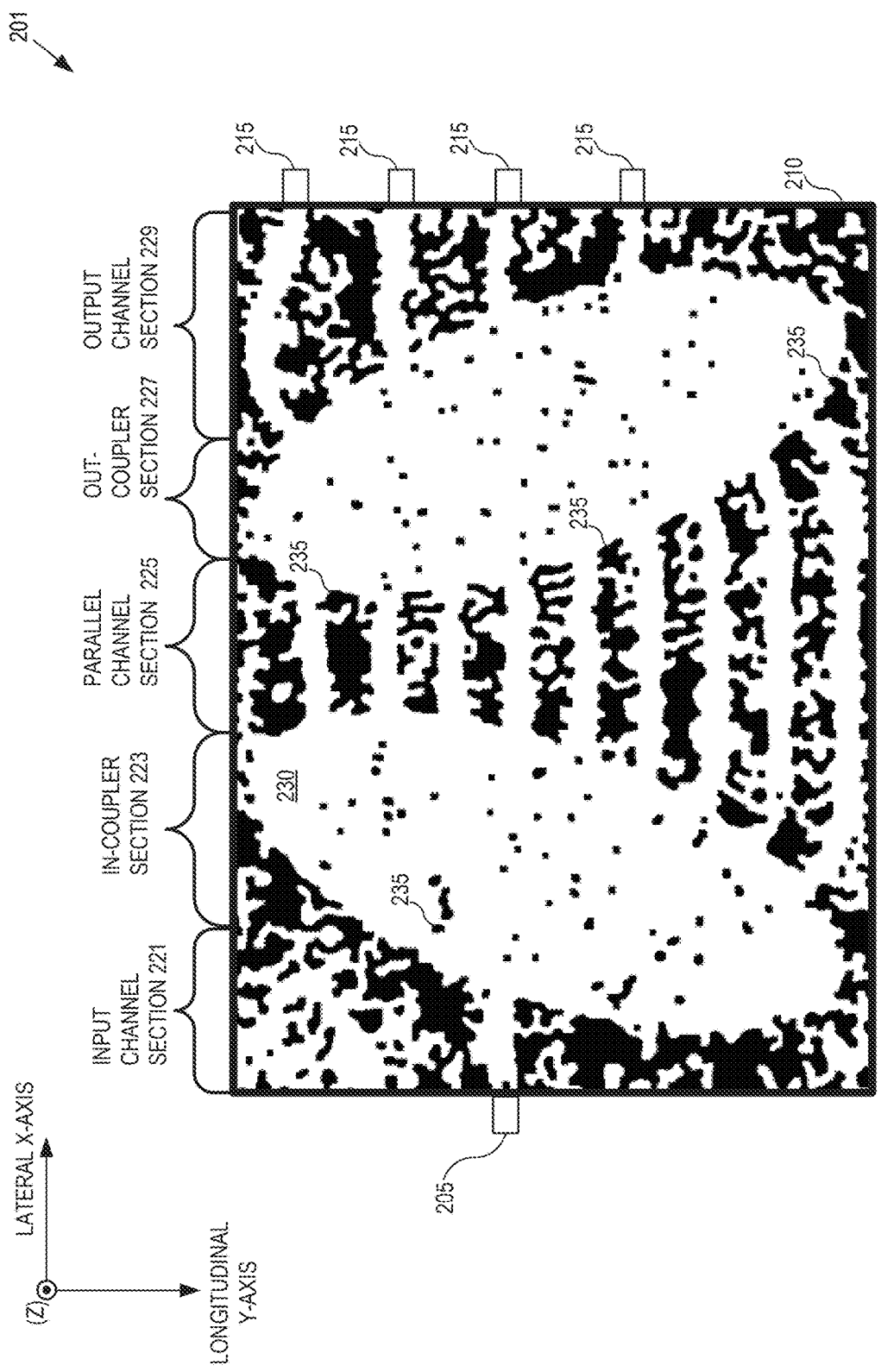
FIG. 2B is a schematic diagram of a photonic device with an inhomogeneous distribution of first material and second material in one or more functional sub-regions, in accordance with an embodiment of the disclosure.

Input channel section 221 can include a respective inhomogeneous distribution of first material 230 and second material 235 that defines an input channel 260 of first material 230 in contrast to a peripheral region of second material 235. As illustrated in FIG. 2B, input channel 260 can correspond to an area of first material 230 that is substantially free of second material 235 but can also include a discontinuous and irregular boundary 265 between input channel 260 and the peripheral region. Through multiple interactions with boundary 265, optical signal 250 can be coupled into in-coupler section 223 from input region 205.

In-coupler section 223 comprises a respective inhomogeneous distribution of first material 230 and second material 235 that configures the in-coupler section to optically couple the input region 205 with the parallel channel section 225. Similar to the input channel section 221, the inhomogeneous distribution of the in-coupler section 223 can be characterized by a first region 270 having a higher composition of first material 230 than of second material 235 and a second region 275 having a higher density of second material 235 than of first material 230, and wherein the first region is characterized by a curvilinear boundary 265 in planar cross-section. In this context, the planar cross-section refers to the plan view illustrated in FIG. 2A, sectioning photonic device 200 in the X-Y plane. While FIG. 2A illustrates photonic device 200 with in-coupler section 223 and out-coupler section 227 having ellipsoidal shapes, the respective inhomogeneous distributions of each sub-region 220 can be a different shape. For example, boundaries 265 can be curvilinear, rectilinear (as described in more detail in reference to FIGS. 3A-3B), and/or polygonal, based at least in part on the outcome of an inverse-design process that optimizes the inhomogeneous distribution of dispersive region 210 to configure photonic device 200 (e.g., optimizing output power, signal loss, and/or demultiplexing efficiency).

As with input channel section 221, boundary 265 of in-coupler section can be irregular (e.g. defined by multiple islands 295 of second material 235 disposed in a matrix of first material 230, or vice-versa). In this way, the curvilinear, rectilinear, polygonal, etc., shape of first region 270 can be developed during an iterative inverse design process, starting from an initialization design that includes discrete binary regions of first material 230 and second material 235. As such, the schematic diagram of FIG. 2A can be understood as an initial design for the inverse design process, an exemplary result of which is shown in FIG. 2B. Through optimization of the placement of islands 295 of a characteristic feature size (e.g., limited by manufacturability constraints of a given SOI system) of second material 235, the inhomogeneous distribution of in-coupler section 223 can be defined, which can diverge from the initialization design and result in irregular boundaries 265. In some embodiments, first dimension 240 and/or second dimension 245 is determined based at least in part on the characteristic feature size. For example, for multiplexing/demultiplexing transformations, the size of photonic device 200 can be positively correlated to the characteristic feature size, with a larger device size being implicated by a larger characteristic feature size. As such, first dimension 240 and/or second dimension 245 can exceed 100 µm based at least in part on the characteristic feature size.

The manufacturability of dispersive region 210 including characteristic and/or minimum feature sizes of islands 295 of second material 235 is a consideration when designing photonic device 200. The shape and configuration of boundary 265 is affected by the minimum feature size of a given fabrication process. The shapes illustrated in FIG. 2A are merely demonstrative of an initial design and may affect the feature size and contour details of structures of sub-regions 220. Inverse design principles may be used to refine or optimize the topological contours and/or feature sizes of the islands 295 and boundaries 265.

Parallel channel section 225 includes multiple channels 280 defined by a respective inhomogeneous distribution of first material 230 and second material 235. Channels 280 can be optically intercoupled to permit electromagnetic interference therebetween, for example, where dispersive region is optically continuous, permitting electromagnetic fields to propagate across boundary 265, as described in more detail in reference to FIGS. 4A-4B. As such, channels 280 can be formed of first material 230 between irregular boundaries 265 formed of second material 235. In some embodiments, continuous paths of first material 230 are formed between channels 280, as illustrated in FIG. 2B. In this way, channels 280 differ from waveguides 115 of AWG 100, which are optically isolated. As in AWG 100, channels 280 can be characterized by different path lengths between in-coupler section 223 and out-coupler section 227. In contrast to AWG 100, however, the inverse design process can result in irregular increments of path length between channels 280.

Figure 4A:
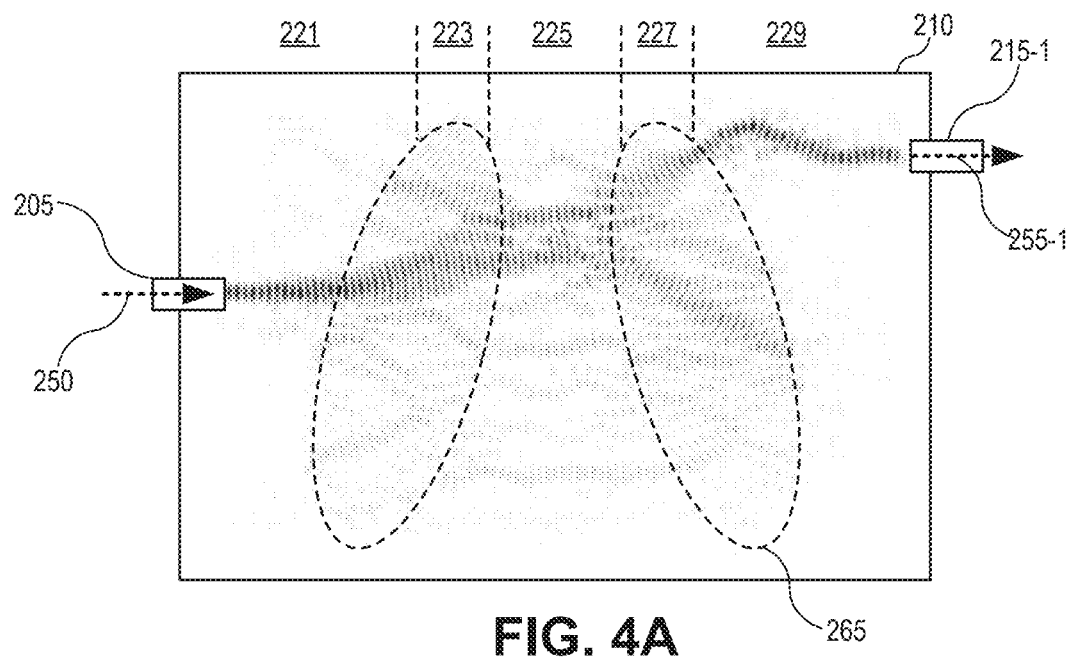
FIG. 4A is a field intensity diagram showing electromagnetic field strength as a function of position in the curvilinear multiplexer/demultiplexer of FIG. 2A.

Out-coupler section 227 includes a respective inhomogeneous distribution of first material 230 and second material 235 that configures out-coupler section 227 to optically couple output channel section 229 with parallel channel section 225. As with in-coupler section 223, out-coupler section can be substantially ellipsoidal, rectangular, polygonal, or the like, defined by boundaries 265, which can be irregularly defined by multiple islands 295 of second material 235. As in AWG 100, out-coupler 227 can induce interference in the optical signal, propagated through sub-regions 220 preceding out-coupler section 227 in the optical path from input region 205 to output regions 215, that at least partially isolates first distinct wavelength channel 255-1 at first output region 215-1. The combined effect of the multiple interactions between optical signal 250 and the interfaces defined by first material 230 and second material 235, results in the isolation of first distinct wavelength channel 215-1 at first distinct wavelength channel 255-1, as illustrated in FIG. 4A.

The respective inhomogeneous distribution of out-coupler section 227 is characterized by a third region 285 having a higher density of first material 230 than of second material 235 and a fourth region 290 having a higher density of second material 235 than of first material 230, where the two regions define a curvilinear periphery in planar cross-section, similar to first region 270 of in-coupler section 223.

Output channel section 229 includes multiple output channels 291 defined by a respective inhomogeneous distribution of first material 230 and second material 235. As with parallel channel section 225, output channels 291 are defined by irregular boundaries 265 and are substantially free of second material 235. In some embodiments, islands 295 of second material 235 can be disposed between boundaries 265 in output channels 291, based at least in part on the results of inverse design optimization of dispersive region 210. In this way, output channels 291 can be formed of first material 230 between boundaries 265 formed of second material 235.

Inverse design principles may be applied to design, refine or optimize any or all of the topological shapes, contours (including the curvatures of sidewalls), or feature sizes of photonic device 200. For example, an inverse design simulator (aka design model) may be configured with an initial design such as 1×4 AWG 100, or an initial design of photonic device 200 (e.g., based at least in part on the schematic illustrated in FIG. 2A), to perform a forward operational simulation of the initial design (e.g., using Maxwell's equations for electromagnetics). The output of the forward operational simulation is a simulated field response at output regions 215. Specific performance parameters of this output field response may be selected as parameters of interest (e.g., power loss, power imbalance, etc.) and are referred to as simulated performance parameters. The simulated performance parameters are used by a performance loss function to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error (e.g., loss gradients) is backpropagated through the design model during the adjoint simulation to generate a structural design error at input region 205. Backpropagation of the performance loss error facilitates the computation of additional performance gradients, such as structural gradients that represent the sensitivity of the performance loss value to changes in the structural material properties (e.g., topology, material types, etc.) of photonic device 200. These gradients are output as a structural design error, which may then be used by a structural optimizer to perform an iterative gradient descent (e.g., stochastic gradient descent) that optimizes or refines the initial structural design to generate a revised structural design. The forward and reverse simulations may then be iterated until the performance loss value falls within acceptable design criteria. The above description is merely an example inverse design technique that may be used to refine or optimize the features and topology of photonic device 200. It is appreciated that other inverse design techniques alone, or in combination with other conventional design techniques, may also be implemented.

FIG. 2B is a schematic diagram of a photonic device 201 with an inhomogeneous distribution of first material 230 and second material 235 in one or more functional sub-regions 220, in accordance with an embodiment of the disclosure. Photonic device 201 is an example result of an inverse design optimization using the schematic diagram illustrated for photonic device 200 of FIG. 2A. For example, dispersive region 210 can include an inhomogeneous distribution of silicon and silicon oxide features (e.g., islands 295), an inhomogeneous distribution of differently doped semiconductor material, or otherwise. The inhomogeneous distribution of first material 230 and second material 235 can include an arrangement or pattern of different refractive material features/portions that collectively apply multiple transformations to optical signals received at input region 205 to demultiplex constituent distinct wavelength channels 255 and isolate individual channels 255 at respective output regions 215, or vice versa. The inverse design techniques described above may be applied to determine the specific material combinations, feature sizes, and feature arrangement (i.e., pattern) to achieve the desired phase matching function via appropriate selection of the performance loss function and target performance values.

Figure 3A:
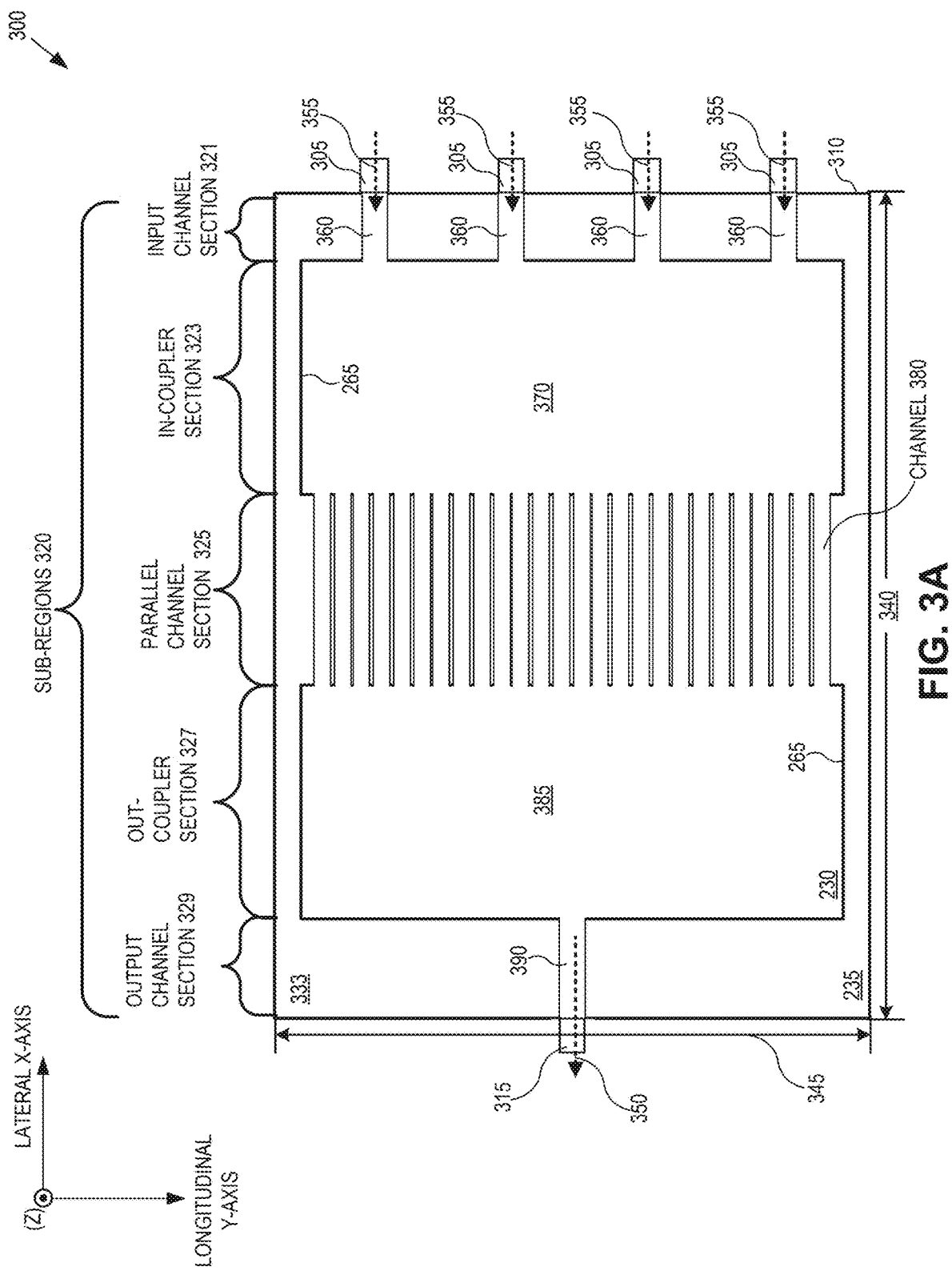
FIG. 3A is a schematic diagram of an example photonic device configured as a rectilinear wavelength-division multiplexer/demultiplexer divided into multiple functional sub-regions affording improved performance and reduced size, in accordance with an embodiment of the disclosure.

FIG. 3A is a schematic diagram of an example photonic device 300 configured as a rectilinear wavelength-division multiplexer/demultiplexer, divided into multiple functional sub-regions 320 affording improved performance and reduced size, in accordance with an embodiment of the disclosure. Photonic device 300 is an example of photonic devices such as photonic device 200 that are designed at least in part using an inverse design process that can be initialized using a binary mapping of first material 230 and second material 235. The schematic diagram of photonic device 300 is an example of such a binary mapping, resulting in an inhomogeneous distribution of first material 230 and second material 235 illustrated in FIG. 3B. Photonic device 300 is illustrated as a wavelength-division multiplexer, configured to receive four distinct wavelength channels 355 at input regions 305 and, through the application of multiple transformations across sub-regions 320 of dispersive region 310, to generate multiplexed output signal 350 at output region 315. It is understood, however, that photonic device 300 can operate as a wavelength-division demultiplexer as well as a multiplexer, for example, by coupling a multiplexed optical signal into output region 315 to generate four distinct wavelength channels 355 at input regions 305.

As with photonic device 200, photonic device 300 includes an input channel section 321, an in-coupler section 323, a parallel channel section 325, an out-coupler section 327, and an output channel section 329, together making up at least a subset of the functional sub-regions of photonic device 300. The structures of sub-regions 320, as with sub-regions 220, can be optically continuous, formed by disposing islands 295 of second material 235 in a matrix of first material 230 or vice-versa, in a manner compatible with CMOS deposition/etch processes. Similar to photonic device 200, photonic device 300 can include channels 380 that are optically intercoupled and input channels 360 that are optically intercoupled, resulting in improved optical performance and reduced footprint (represented by lateral dimension 340 and longitudinal dimension 345) that can be orders of magnitude smaller than typical AWG devices.

As described in more detail in reference to FIG. 2A, photonic device 300 includes rectangular shaped first region 370 and second region 385, as well as linear input channels 360, channels 380, and output channel(s) 390. In this way, photonic device 300 is termed a "rectilinear" device. In typical optical element configurations, right angles can induce optical effects, such as reflections, destructive interference, or the like, that impair performance. Such effects are typically avoided by avoiding right angles in a photonic device design. With photonic device 300, however, boundary 265 can be irregular, and islands 295 of second material 235 can be disposed to attenuate and/or eliminate adverse optical effects of reflections and interference.

Figure 3B:
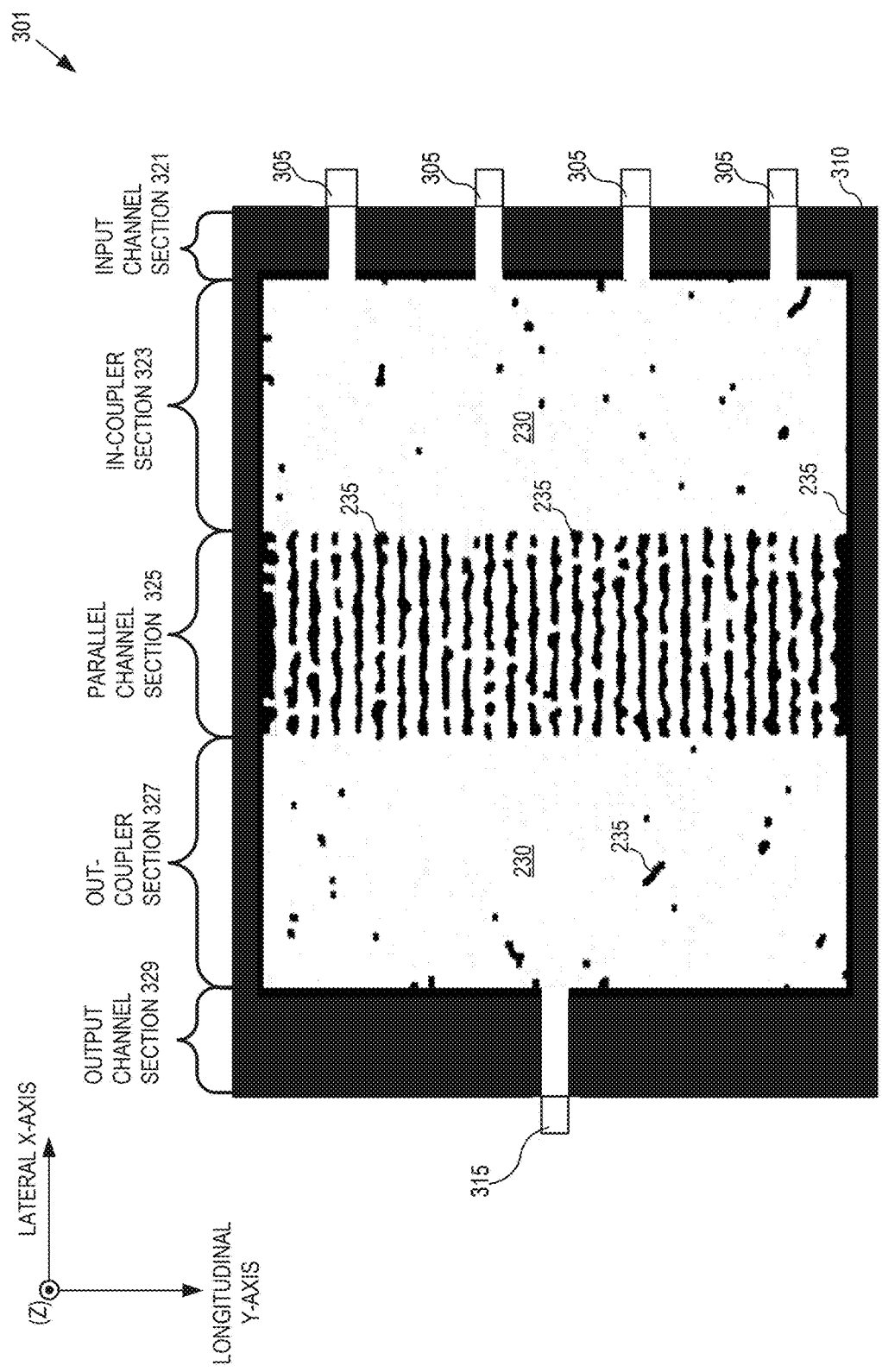
FIG. 3B is a schematic diagram of a photonic device 300 with an inhomogeneous distribution of first material and second material in one or more functional sub-regions, in accordance with an embodiment of the disclosure.

FIG. 3B is a schematic diagram of a photonic device 301 with an inhomogeneous distribution of first material 230 and second material 235 in one or more functional sub-regions 320, in accordance with an embodiment of the disclosure. Together the inhomogeneous distribution of first material 230 and second material 235 configure photonic device 301 to act as a 4×1 wavelength-division multiplexer/demultiplexer. Photonic device 301 is an example of a structure resulting from an inverse design process optimizing the schematic diagram of FIG. 3A. As described in more detail in reference to FIG. 2A, inverse design optimization of a binary mapping of first material 230 and second material 235, where the binary mapping includes functional sub-regions as defined in FIG. 3A, can result in the distribution shown in dispersive region 310. As an iterative optimization technique, inverse design processes can generate different inhomogeneous distributions based at least in part on optimization convergence criteria and the initialization configuration of dispersive region 310. In this way, the binary mapping of materials 230 and 235 in photonic device 301 are understood to represent a non-limiting example embodiment.

Figure 4B:
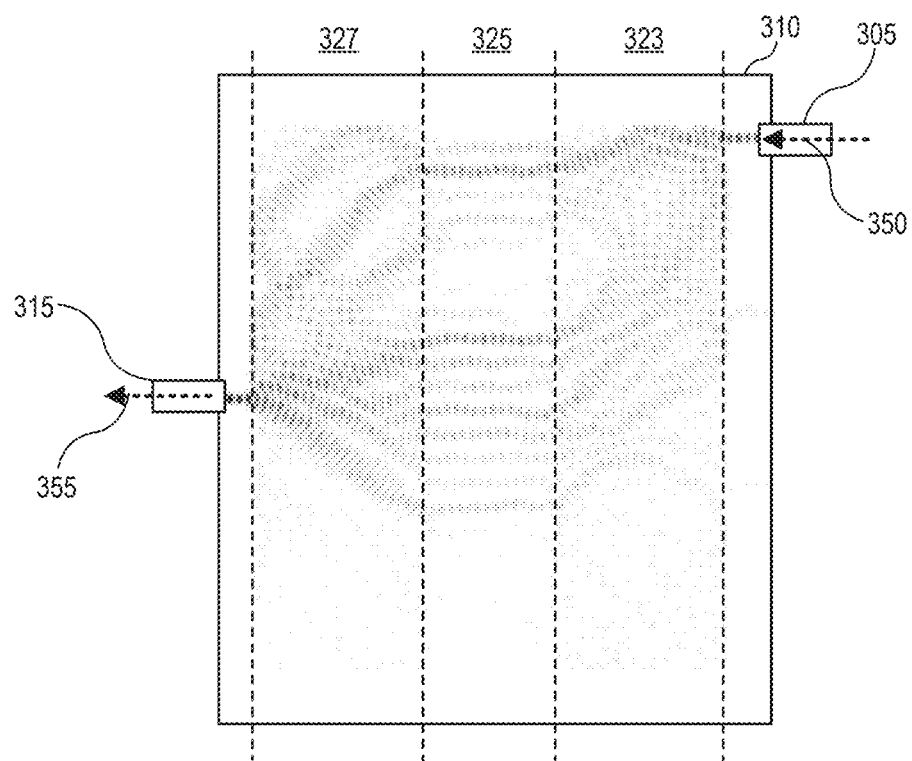
FIG. 4B is a field intensity diagram showing electromagnetic field strength as a function of position in the rectilinear multiplexer/demultiplexer of FIG. 3A.

FIG. 4A is a field intensity diagram showing electromagnetic field strength as a function of position in the curvilinear multiplexer/demultiplexer of FIG. 2A. Similarly, FIG. 4B is a field intensity diagram showing electromagnetic field strength as a function of position in the rectilinear multiplexer/demultiplexer of FIG. 3A. FIGS. 4A-4B represent simulation results generated using the structures shown in FIG. 2B and FIG. 3B, with darker coloration indicating greater field intensity. As illustrated, photonic device 201 isolates a distinct wavelength channel 255 to a respective output region 215-1 (FIG. 4A) and photonic device 301 generates a multiplexed output signal 350 including a distinct wavelength channel 355 at output region 315 (FIG. 4B).

As shown, dispersive regions 210 and 310 can be optically continuous in at least two dimensions, as indicated by the nonzero values of field intensity over sub-regions 220 and 320. Advantageously, the structures illustrated in FIGS. 2B and 3B, being exemplary of photonic devices of the present disclosure, can improve multiplexing/demultiplexing performance in a photonic device in a smaller footprint than what is otherwise possible for AWGs that rely on mutually optically isolated waveguides 115 and phase-mismatch interference to perform wavelength-division mux/demux.

Figure 5:
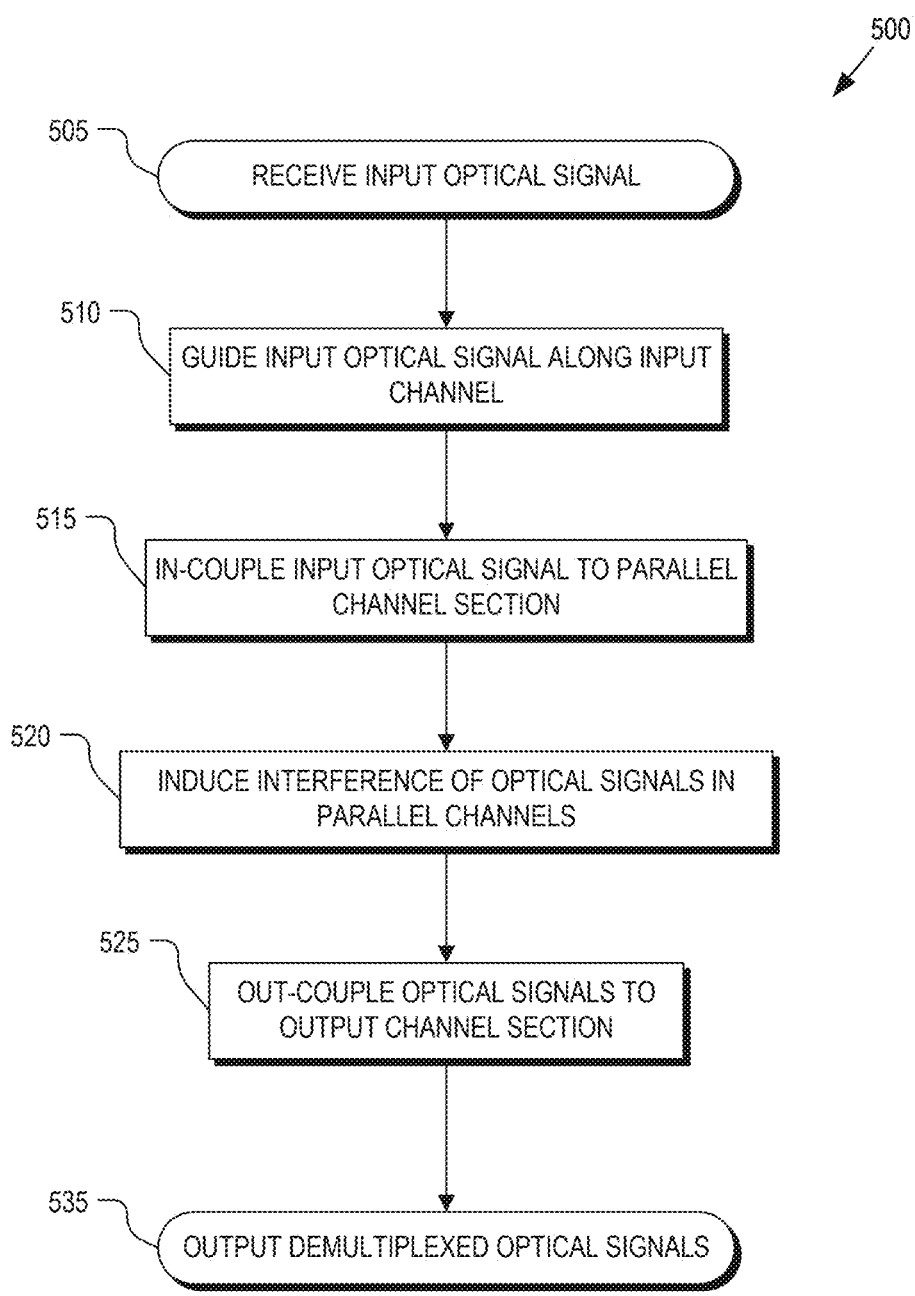
FIG. 5 is a flow chart illustrating operation of the multiplexer/demultiplexer as a wavelength-division multiplexer, in accordance with an embodiment of the disclosure.

FIG. 5 is a flow chart illustrating an example process 500 of the photonic devices 200 and 300 of FIG. 2A and FIG. 3A, in accordance with an embodiment of the disclosure. Process 500 describes a wavelength-division demultiplexing function of photonic device 200; however, it should be appreciated that photonic device 200 can also operate in reverse as a multiplexer. Photonic device 200 can operate as a multiplexer in accordance with the described order of process operations 505-535. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

At process block 505, input optical signal 250 is received at input region 205. Input region 205 couples optical signal 250 into input channel 260 that guides optical signal 250 toward in-coupler section 223 as part of process block 510. As described in more detail in reference to FIG. 2A, propagation of input optical signal 250 can include multiple interactions with reflective/refractive interfaces between first material 230 and second material 235, for example, at boundaries 265.

At process block 515, optical signal 250 is coupled into parallel channel section 225, across multiple channels 280, as illustrated in FIG. 4A and FIG. 4B. Also illustrated in FIG. 4A, electromagnetic interference between channels 280 can be extensive, at process block 520, due at least in part to the presence first material 230 that optically intercouples channels 280.

At process block 525, out-coupler section 227 conducts electromagnetic radiation including distinct wavelength channels 255 from parallel channel section 225 to output channel section 229. As illustrated in FIG. 4A, the geometry of third region 285 and the orientation of output channels 291 relative to third region 285 induces electromagnetic interference that isolates first distinct wavelength channel 255-1 at first output region 215-1. In this way, for a multiplexed optical signal 250 including multiple distinct wavelength channels 255, photonic device 200 can be configured by the inhomogeneous distribution of first material 230 and second material 235 in dispersive region 210 to output multiple individual distinct wavelength channels 255 at respective output regions 215 (process block 535).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic device, comprising:
   input region adapted to receive an optical signal including a multiplexed channel, the multiplexed channel characterized by a distinct wavelength;
   a dispersive region, optically coupled with the input region to receive the optical signal, the dispersive region including a plurality of sub-regions defined by an inhomogeneous arrangement of a first material and a second material; and
   a plurality of output regions, optically coupled with the input region via the dispersive region;
   wherein:
   the plurality of sub-regions include an input channel section, an in-coupler section, a parallel channel section, an out-coupler section, and an output channel section; and the plurality of sub-regions together configure the photonic device to demultiplex the optical signal and to isolate the multiplexed channel at a first output region of the plurality of output regions.

2. The photonic device of claim 1, wherein the in-coupler section comprises a first inhomogeneous distribution of the first material and the second material that configures the in-coupler section to optically couple the input region with the parallel channel section, the first inhomogeneous distribution being characterized by a first region having a higher composition of the first material than the second material and a second region having a higher composition of the second material than the first material, and wherein the first region is characterized by a curvilinear periphery in planar cross-section.

3. The photonic device of claim 1, wherein the parallel channel section comprises a first plurality of channels defined by a second inhomogeneous distribution of the first material and the second material, wherein the first plurality of channels is optically intercoupled to permit electromagnetic interference therebetween, and wherein the first plurality of channels are formed of the first material between an irregular boundary formed of the second material.

4. The photonic device of claim 1, wherein the output channel section comprises a second plurality of channels defined by a third distribution of the first material and the second material and wherein the second plurality of channels are formed of the first material between boundaries formed of the second material.

5. The photonic device of claim 1, wherein the out-coupler section comprises a fourth inhomogeneous distribution of the first material and the second material that configures the out-coupler section to:
optically couple the output channel section with the parallel channel section; and
induce interference in the optical signal that at least partially isolates the multiplexed channel at a first output channel of the output channel section,
wherein the fourth inhomogeneous distribution is characterized by a third region having a higher density of the first material than of the second material and a fourth region having a higher density of the second material than of the first material, and wherein the third region is characterized by a curvilinear periphery in planar cross-section.

6. The photonic device of claim 1, wherein the optical signal comprises a plurality of multiplexed channels characterized by respective distinct wavelength channels and wherein the plurality of sub-regions together configure the photonic device to demultiplex the multiplexed optical signal and to isolate the plurality of multiplexed channels at respective output regions of the plurality of output regions.

7. The photonic device of claim 6, wherein the plurality of distinct channels comprises:
a first distinct wavelength channel characterized by a central wavelength of about 1266 nm;
a second distinct wavelength channel characterized by a central wavelength of about 1269 nm;
a third distinct wavelength channel characterized by a central wavelength of about 1312 nm; and
a fourth distinct wavelength channel characterized by a central wavelength of about 1366 nm.

8. The photonic device of claim 1, wherein the photonic device is characterized by a length in a first dimension from about 1 µm to about 100 µm, and a width in a second dimension from about 1 µm to about 100 µm, wherein the first dimension is orthogonal to the second dimension.

9. The photonic device of claim 1, wherein the plurality of sub-regions is optically continuous in at least two dimensions over the dispersive region.

10. The photonic device of claim 1, wherein the inhomogeneous arrangement of the first material and the second material comprises a plurality of islands of the second material disposed in a matrix of the first material, and wherein the matrix is coextensive with the dispersive region.

11. A photonic device, comprising:
a plurality of input regions adapted to receive a plurality of distinct channels characterized by respective distinct wavelengths;
a dispersive region, optically coupled with the plurality of input regions to receive respective distinct channels of the plurality of distinct channels, the dispersive region including a plurality of sub-regions defined by an inhomogeneous arrangement of a first material and a second material; and
an output region, optically coupled with the plurality of input regions via the dispersive region;
wherein:
the plurality of sub-regions include an input channel section, and in-coupler section, a parallel channel section, an out-coupler section, and an output channel section; and
the plurality of sub-regions together configure the photonic device to multiplex the plurality of distinct channels and to provide a multiplexed output signal at the output region.

12. The photonic device of claim 11, wherein the input channel section comprises a first inhomogeneous distribution of the first material and the second material that configures the input channel section to optically couple the plurality of input regions with the in-coupler section, wherein the input channel section comprises a first plurality of channels defined by the first inhomogeneous distribution, and wherein the first plurality of channels is optically intercoupled to permit electromagnetic interference therebetween.

13. The photonic device of claim 11, wherein the in-coupler section comprises a second inhomogeneous distribution of the first material and the second material that configures the in-coupler section to optically couple the input channel section with the parallel channel section, the second inhomogeneous distribution being characterized by a first region having a higher density of the first material than of the second material and a second region having a higher density of the second material than of the first material, and wherein the first region is characterized by a rectilinear periphery in planar cross-section.

14. The photonic device of claim 11, wherein the parallel channel section comprises a second plurality of channels defined by a third inhomogeneous distribution of the first material and the second material, wherein the second plurality of channels is optically intercoupled to permit electromagnetic interference therebetween, and wherein the channels of the first plurality of channels are formed of the first material between an irregular boundary formed of the second material.

15. The photonic device of claim 11, wherein the out-coupler section comprises a fifth inhomogeneous distribution of the first material and the second material that configures the out-coupler section to optically couple the output channel section with the parallel channel section, the fifth inhomogeneous distribution being characterized by a third region having a higher density of the first material than of the second material and a fourth region having a higher density of the second material than of the first material, and wherein the third region is characterized by a rectilinear periphery in planar cross-section.

16. The photonic device of claim 11, wherein the output channel section comprises an output channel defined by a fourth distribution of the first material and the second material, and wherein the output channel section is configured to optically couple the out-coupler section with the output region.

17. The photonic device of claim 11, wherein the plurality of distinct channels comprises:
   a first distinct wavelength channel characterized by a central wavelength of about 1266 nm;
   a second distinct wavelength channel characterized by a central wavelength of about 1269 nm;
   a third distinct wavelength channel characterized by a central wavelength of about 1312 nm; and
   a fourth distinct wavelength channel characterized by a central wavelength of about 1366 nm.

18. The photonic device of claim 11, wherein the photonic device is characterized by a length in a first dimension from about 1 μm to about 100 μm and a width in a second dimension from about 1 μm to about 100 μm, wherein the first dimension is orthogonal to the second dimension.

19. The photonic device of claim 11, wherein the plurality of sub-regions is optically continuous in at least two dimensions over the dispersive region.

20. The photonic device of claim 11, wherein the inhomogeneous arrangement of the first material and the second material comprises a plurality of islands of the second material disposed in a matrix of the first material, and wherein the matrix is coextensive with the dispersive region.

* * * * *